US009534891B2

(12) United States Patent
Herrera et al.

(10) Patent No.: US 9,534,891 B2
(45) Date of Patent: Jan. 3, 2017

(54) METHOD AND SYSTEM OF ANGLE ESTIMATION (71) Applicant: Jaguar Land Rover Limited, Whitley Coventry Warwickshire (GB)

(72) Inventors: Juan Herrera, Inca (ES); Mark Flinders, Leamington Spa (GB); Nick Solomon, Leamington Spa (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 232 days.

(21) Appl. No.: 14/020,545

(22) Filed: Sep. 6, 2013

(65) Prior Publication Data

US 2015/0073744 A1    Mar. 12, 2015

(30) Foreign Application Priority Data

Feb. 4, 2013    (GB) .................................. 1301947.6

(51) Int. Cl.
*G01B 21/22*    (2006.01)
*B60W 40/076*   (2012.01)
(Continued)

(52) U.S. Cl.
CPC ............ *G01B 21/22* (2013.01); *B60W 40/076* (2013.01); *G01M 17/06* (2013.01); *G01P 15/00* (2013.01);
(Continued)

(58) Field of Classification Search
CPC ......... G01B 21/22; G01B 21/24; G01B 21/26; G01P 15/00; G01P 15/003; G01P 15/005; G01M 17/06; G01M 17/065; G01M 17/0072; B60W 40/076; B60W 2030/043; B60W 2420/095; B60W 2520/00; B60W 2520/06; B60W 2520/10; B60W 2520/12; B60W 2520/125; B60W 2520/14; B60W 2520/16; B60W 2520/18
See application file for complete search history.

(56) References Cited

U.S. PATENT DOCUMENTS 6,065,558 A      5/2000   Wielenga
2004/0162654 A1* 8/2004   Lu ...................... B60G 17/0162
                                                 701/38

* cited by examiner

*Primary Examiner* — Toan Le
(74) *Attorney, Agent, or Firm* — Reising Ethington P.C.

(57) ABSTRACT

A method of angle estimation for use in a vehicle which is travelling on a surface. The vehicle includes a vehicle body having a first axis and being attached to at least two wheels. The method includes the steps of: providing a first height sensor for measuring $h_1$, the height of the vehicle body with respect to the first wheel; providing a second height sensor for measuring $h_2$, the height of the vehicle body with respect to the second wheel; providing a surface angle sensor for measuring $\theta_{road}$, the angle of the surface in relation to a horizontal plane; measuring the values of $h_1$, $h_2$ and $\theta_{road}$; using the values of $h_1$ and $h_2$ to calculate $\theta_{rel}$, the angle of the vehicle body relative to the surface; and calculating an estimate of $\theta_{glob}$, the angle between the first axis and the horizontal plane, from $\theta_{road}$ and $\theta_{rel}$.

17 Claims, 2 Drawing Sheets

(51) Int. Cl.
*G01M 17/06* (2006.01)
*G01P 15/00* (2006.01)
*B60W 30/04* (2006.01)
*B60W 50/00* (2006.01)

(52) U.S. Cl.
CPC *B60W 2030/043* (2013.01); *B60W 2050/0055* (2013.01); *B60W 2420/905* (2013.01); *B60W 2520/16* (2013.01)

METHOD AND SYSTEM OF ANGLE ESTIMATION

TECHNICAL FIELD

This invention relates to a method and system for angle estimation for use in a vehicle. Aspects of the invention relate to a method, to a system and to a vehicle.

BACKGROUND

When a vehicle such as a car turns around a bend, the turning force originates from an interaction between the vehicle tires and the road. Since this is very low in height with respect to the centre of gravity of the vehicle, the vehicle may roll around its longitudinal axis. To an extent, such a roll can be absorbed by the vehicle's suspension. However, if the vehicle rolls too far, then one or more of the vehicle's wheels will lose contact with the road.

In extreme situations, this roll, if not addressed by the driver, may lead to a rollover event. Even when the vehicle does not experience a rollover, the rolling motion may still reduce the driver's ability to control the vehicle. Moreover, the sensation of one or more wheels losing contact with the road is disquieting for the driver and any passengers.

Therefore it is typically desirable to avoid situations in which the vehicle experiences significant forces inducing vehicle roll. U.S. Pat. No. 6,065,558 describes a brake system for preventing a friction rollover of a vehicle. The system operates by actuating the brakes of the vehicle in response to a rollover signal indicating that rollover is likely to occur. Braking the vehicle reduces the rolling force, and so helps to prevent rollover. However, the system is dependent on the rollover signal, which is produced by a sensor. U.S. Pat. No. 6,065,558 contemplates using an accelerometer as the sensor, or switches for signaling compression of either of the rebound bumpers. However both of these solutions have drawbacks.

Firstly, if electrical switches in the rebound bumpers are used, then the switches may also be compressed when braking is not required, for example due to an uneven driving surface. This is especially inconvenient in an off-road vehicle.

Secondly, if an accelerometer is used, then the measurements of the accelerometer are subject to contamination due to movements in the vehicle about other axes. In particular, if the vehicle undergoes a pitching motion at the same time as a yawing motion and a rolling motion, then a component of the pitch will be measured as a component of the roll. This will tend to result in false positives causing the vehicle to brake unnecessarily, or worse, false negatives which cause the vehicle to brake too late.

Since the system described in U.S. Pat. No. 6,065,558 is intended to prevent frictional rollover, which is caused when the vehicle is yawing (turning) sharply, this scenario is common.

However, if the pitching motion can be measured accurately, then this information can be used to make a correction to the measurements of the rolling motion. Measuring the pitching motion is not a trivial problem, since sensors which detect the pitching of the vehicle are subject to the same problems with transitory noise as sensors which detect the rolling of the vehicle.

Therefore a system or method for providing vehicle pitch estimation would be desirable.

BRIEF SUMMARY OF THE INVENTION

Aspects of the invention provide a method, a system and a vehicle as claimed in the appended claims.

In accordance with a first aspect of the invention, there is provided a method of angle estimation for use in a vehicle which is travelling on a surface, the vehicle comprising a vehicle body which is attached to at least two wheels, the vehicle body having a first axis, the method comprising: calculating $\theta_{glob1}$, a first estimate of $\theta_{glob}$, the angle between the first axis and the horizontal plane; applying a high pass filter to $\theta_{glob1}$ to produce $\theta_{glob}$transient, an estimate of transient values of $\theta_{glob}$; calculating $\theta_{glob}$steady state, an estimate of steady state values of $\theta_{glob}$; and calculating a further estimate of $\theta_{glob}$ from $\theta_{glob}$transient and $\theta_{glob}$steady state.

In this way, a method according to the invention can provide a more accurate estimate of the angle of the vehicle. In particular, the methods chosen to provide the first and second estimates of $\theta_{glob}$ can be chosen to provide the greatest accuracy in their respective frequency domains.

It may be that the method further comprises calculating $\theta_{glob2}$, a second estimate of $\theta_{glob}$, and applying a low pass filter to $\theta_{glob2}$ to produce $\theta_{glob}$steady state.

It may be that the method further comprises calculating $\theta_{glob3}$, a third estimate of $\theta_{glob}$. The method may further comprise applying a high and a low pass filter to $\theta_{glob3}$ to provide $\theta_{glob}$intermediate, an estimate of the values of $\theta_{glob}$ which lie between the steady state and the transient domains. The method may then further comprise calculating a further estimate of $\theta_{glob}$ from $\theta_{glob}$transient and $\theta_{glob}$intermediate and $\theta_{glob}$steady state.

It may be that the method further comprises at least a fourth estimate of $\theta_{glob}$, the fourth and subsequent estimates of $\theta_{glob}$ each being filtered to provide an estimate of the values of $\theta_{glob}$ which lie within a frequency domain. The method may then further comprise calculating a further estimate of $\theta_{glob}$ from all of the filtered estimates.

It may be that the method further comprises applying a low pass filter to $\theta_{glob1}$. It may be that the method further comprises applying a high pass filter to $\theta_{glob2}$.

In accordance with a second aspect there is provided a method of angle estimation for use in a vehicle which is travelling on a surface, the vehicle comprising a vehicle body which is attached to at least two wheels, the vehicle body having a first axis, the method comprising: providing a first height sensor for measuring $h_1$, the height of the vehicle body with respect to the first wheel; providing a second height sensor for measuring $h_2$, the height of the vehicle body with respect to the second wheel; providing a surface angle sensor for measuring $\theta_{road}$, the angle of the surface in relation to a horizontal plane; measuring the values of $h_1$, $h_2$ and $\theta_{road}$; using the values of $h_1$ and $h_2$ to calculate $\theta_{rel}$, the angle of the first axis relative to the surface; and calculating an estimate of $\theta_{glob}$, the angle between the first axis and the horizontal plane, from $\theta_{road}$ and $\theta_{rel}$.

In this way the invention provides an alternative method for estimating the angle of an axis in the vehicle body with respect to a horizontal plane. This method can be used in parallel with or as an alternative to the methods of roll estimation which are considered in the prior art. Advantageously, height sensors provide reliable measurements which can be used to provide accurate estimates of $\theta_{rel}$ across all frequency domains.

In an embodiment according to the first aspect, it may be that the method comprises: providing a first height sensor for measuring $h_1$, the height of the vehicle body with respect to the first wheel; providing a second height sensor for measuring $h_2$, the height of the vehicle body with respect to the second wheel; providing a surface angle sensor for measuring $\theta_{road}$, the angle of the surface in relation to a horizontal plane; providing an orientation sensor for measuring $\dot{\theta}_{glob}$, $\dot{\theta}_{glob}$ being the rate of change of $\theta_{glob}$ with respect to time; measuring the values of $h_1$, $h_2$, $\theta_{road}$ and $\dot{\theta}_{glob}$; integrating $\dot{\theta}_{glob}$ with respect to time to calculate $\theta_{glob1}$; applying a high pass filter to $\theta_{glob1}$ to produce $\theta_{glob}$transient; using the values of $h_1$ and $h_2$ to calculate $\theta_{rel}$, the angle of the first axis relative to the surface; combining $\theta_{rel}$ and $\theta_{road}$, and applying a low pass filter, to calculate $\theta_{glob}$steady state; and calculating an estimate of $\theta_{glob}$ from $\theta_{glob}$transient and $\theta_{glob}$steady state.

It may be that the method comprises combining $\theta_{rel}$ and $\theta_{road}$ and then applying a low pass filter, to calculate $\theta_{glob}$steady state. Alternatively, it may be that the method comprises applying a low pass filter to $\theta_{rel}$ and $\theta_{road}$, and then combining the results to calculate $\theta_{glob}$steady state.

The height $h_1$ is typically measured as the distance between a predefined point on the first wheel and a predefined point on a first plane, the first plane being a plane defined with respect to the vehicle body which contains the first axis. Similarly, the height h2 and any other height measurements are typically measured as the distance between a predefined point on a wheel and a predefined point on the first plane. Typically, the predefined point on a wheel will coincide with the axle of that wheel.

In order for the method above to be used, the closest point on the first axis to the first wheel must be located at a different location to the closest point on the first axis to the second wheel.

It may be that the vehicle comprises at least four wheels.

The high and low pass filters may be static band pass filters. Alternatively, one or more of the filters may be a frequency active or adaptive filter.

Orientation sensors, like all other sensors, are subject to inaccuracies. As such, the integral of $\dot{\theta}_{glob}$ will become inaccurate over time, due to the cumulative influence of inaccuracies in the measurements and sensor offsets. As these inaccuracies typically accumulate slowly, the integral is typically a reliable indicator of transient, or higher frequency, changes in $\theta_{glob}$, but a poor indicator of steady state, or lower frequency, changes. By relying upon the orientation sensors for the transient components of $\theta_{glob}$, and using alternative measurements to provide the steady state components, the method above can provide a more accurate estimate of $\theta_{glob}$.

The method can be used to calculate pitch in a vehicle. It can also be used to calculate roll in a vehicle. When calculating pitch, $\theta_{road}$ and $\theta_{rel}$ are measured in the typical direction of motion of the vehicle, that is the vehicle's "forward" direction when not turning. When calculating pitch, the first axis is longitudinal with respect to a typical vehicle body. When calculating roll, the first axis is lateral with respect to a typical vehicle body.

The horizontal plane is defined with respect to gravity, and is perpendicular to a vector indicating the direction of acceleration due to gravity.

The vehicle may comprise as many wheels as are necessary. The method may comprise providing third, fourth or more height sensors. The method may comprise providing at least one height sensor for each wheel of the vehicle.

Typically, the orientation sensor is a gyroscope.

The surface angle sensor may comprise some component which is attached to the vehicle such that it moves with the wheels. Alternatively, the surface angle sensor may be attached to the vehicle body. The surface angle sensor may comprise a location sensor, such as a GPS sensor, which uses map data to determine the terrain surrounding the vehicle.

Alternatively, the surface angle sensor may measure the orientation of the surface based upon direct measurements.

Typically, the surface angle sensor comprises an accelerometer for measuring $a_x$, the acceleration of the vehicle with respect to the first axis. The surface angle sensor may further comprise at least a second accelerometer, for measuring acceleration with respect to other axes. The surface angle sensor may further comprise a wheel speed sensor. The surface angle sensor may further comprise a sensor for determining the direction of the vehicle's steering.

It may be that measuring $\theta_{road}$ comprises calculating an estimate $\theta_{road}'$, using the relationship:

$$\theta_{road}' = \theta_{glob}' - \theta_{rel}',$$

wherein $\theta_{glob}'$ and $\theta_{rel}'$ are estimates of $\theta_{glob}$ and $\theta_{rel}$.

It may be that the method comprises calculating $\theta_{glob}'$ based on $a_x$, the yaw of the vehicle, and the speed of the vehicle.

Typically, the method comprises calculating $\theta_{glob}'$ using the equation:

$$\theta'_{glob} = \arcsin\left(\frac{a_x - \dot{u} + \omega_z v_y}{g}\right)$$

wherein:
$\omega_z$ is the rate of yaw of the vehicle;
$v_y$ is the velocity of the vehicle along a second axis, the second axis being perpendicular to the first axis and perpendicular to the direction of acceleration due to gravity;
$\dot{u}$ is the derivative with the respect to time of the speed of the vehicle along the first axis.

The rate of yaw of the vehicle is the rate of change of the yaw with respect to time. The yaw of the vehicle is the instantaneous angle of the vehicle as it rotates about an axis, here defined as the z axis.

In the above equation, g is the acceleration due to gravity in the vehicle's expected operating environment. Typically, $\dot{u}$ is determined by measuring the wheel speed of the vehicle and differentiating with respect to time.

When calculating pitch, the second axis is lateral with respect to a typical vehicle body. When calculating roll, the second axis is longitudinal with respect to a typical vehicle body.

Typically, the method comprises calculating $\theta_{rel}'$ using the equation:

$$\frac{\theta'_{rel}}{a_x} = \frac{M_s h_{cg}}{K_{pitch} + D_{pitch} s}$$

wherein:
$M_s$ is the mass of the vehicle;
$h_{cg}$ is the height of the centre of gravity of the vehicle;
$K_{pitch}$ is the spring term associated with the vehicle suspension; and
$D_{pitch}s$ is the damping term associated with the vehicle suspension.

The mass of the vehicle may be a predetermined value, based upon the typical loading of the vehicle. Alternatively, the mass may be measured, for example using the height sensors while the vehicle is at rest, since the height of the vehicle with respect to its wheels when at rest is at least partly determined by the weight of the vehicle. Similarly, the height of the centre of gravity may be a predetermined value, based upon the typical loading of the vehicle.

In accordance with a third aspect of the invention, there is provided an angle estimation system for use in a vehicle which is travelling on a surface, the vehicle comprising a vehicle body which is attached to at least two wheels, the vehicle body having a first axis, the angle estimation system comprising a control unit, the control unit being arranged to: calculate $\theta_{glob1}$, a first estimate of $\theta_{glob}$, the angle between the first axis and the horizontal plane; apply a high pass filter to $\theta_{glob1}$ to produce $\theta_{glob}$transient, an estimate of transient values of $\theta_{glob}$; calculate $\theta_{glob}$steady state, an estimate of steady state values of $\theta_{glob}$; and calculate a further estimate of $\theta_{glob}$ from $\theta_{glob}$transient and $\theta_{glob}$steady state.

In accordance with a fourth aspect of the invention, an angle estimation system is provided for use in a vehicle which is travelling on a surface, the vehicle comprising a vehicle body which is attached to at least two wheels, the vehicle body having a first axis, the angle estimation system comprising: a first height sensor for measuring $h_1$, the height of the vehicle body with respect to the first wheel; a second height sensor for measuring $h_2$, the height of the vehicle body with respect to the second wheel; a surface angle sensor for measuring $\theta_{road}$, the angle of the surface in relation to a horizontal plane; and a control unit. The control unit is arranged to: receive signals from the sensors indicating the values of $h_1$, $h_2$ and $\theta_{road}$; use the values of $h_1$ and $h_2$ to calculate $\theta_{rel}$, the angle of the first axis relative to the surface; and calculate an estimate of $\theta_{glob}$, the angle between the first axis and the horizontal plane, from $\theta_{road}$ and $\theta_{rel}$.

In an angle estimation system according to the third aspect, it may be that the angle estimation system further comprises: a first height sensor for measuring $h_1$, the height of the vehicle body with respect to the first wheel; a second height sensor for measuring $h_2$, the height of the vehicle body with respect to the second wheel; a surface angle sensor for measuring $\theta_{road}$, the angle of the surface in relation to a horizontal plane; and an orientation sensor for measuring $\theta_{glob}$, $\dot{\theta}_{glob}$ being the rate of change of $\theta_{glob}$ with respect to time. The control unit is arranged to: receive signals from the sensors indicating the values of $h_1$, $h_2$, $\theta_{road}$ and $\dot{\theta}_{glob}$; integrate $\dot{\theta}_{glob}$ with respect to time to calculate $\theta_{glob1}$; apply a high pass filter to $\theta_{glob1}$ to produce $\theta_{glob}$transient; use the values of $h_1$ and $h_2$ to calculate $\theta_{rel}$, the angle of the first axis relative to the surface; combine $\theta_{rel}$ and $\theta_{road}$, and applying a low pass filter, to produce $\theta_{glob}$steady state, an estimate of steady state values of $\theta_{glob}$; and calculate an estimate of $\theta_{glob}$ from $\theta_{glob}$transient and $\theta_{glob}$steady state.

Typically, the surface angle sensor comprises an accelerometer for measuring $a_x$, the acceleration of the vehicle with respect to the first axis.

It may be that measuring $\theta_{road}$ comprises calculating an estimate $\theta_{road}'$, using the relationship:

$$\theta_{road}' = \theta_{glob}' - \theta_{rel}',$$

wherein $\theta_{glob}'$ and $\theta_{rel}'$ are estimates of $\theta_{glob}$ and $\theta_{rel}$.

It may be that the control unit is further arranged to calculate $\theta_{glob}'$ using the equation:

$$\theta_{glob}' = \arcsin\left(\frac{a_x - \dot{u} + \omega_z v_y}{g}\right)$$

wherein:
$\omega_z$ is the rate of yaw of the vehicle;
$v_y$ is the velocity of the vehicle along a second axis, the second axis being perpendicular to the first axis and perpendicular to the direction of acceleration due to gravity;

$\dot{u}$ is the derivative with the respect to time of the speed of the vehicle along the first axis.

It may be that in an angle estimation system as defined above, the control unit is further arranged to calculate $\theta_{rel}'$ using the equation:

$$\frac{\theta_{rel}'}{a_x} = \frac{M_s h_{cg}}{K_{pitch} + D_{pitch} s}$$

wherein:
$M_s$ is the mass of the vehicle;
$h_{cg}$ is the height of the centre of gravity of the vehicle;
$K_{pitch}$ is the spring term associated with the vehicle suspension; and
$D_{pitch}$ is the damping term associated with the vehicle suspension.

According to a fifth aspect of the invention, there is provided a vehicle comprising any of the angle estimation systems as described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described in connection with one aspect or embodiment are applicable to all aspects or embodiments, except where such features are incompatible.

BRIEF DESCRIPTION OF THE DRAWINGS

Embodiments of the invention will now be described, by way of example only, with reference to the accompanying drawings, in which.

DETAILED DESCRIPTION OF THE ILLUSTRATED EMBODIMENTS

Figure 1:
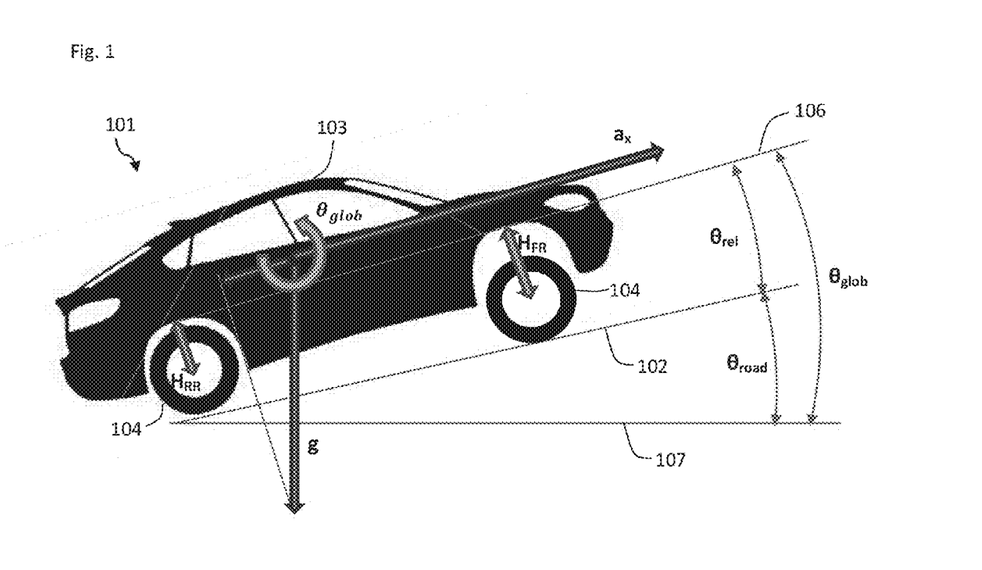
FIG. 1 is a diagram of a vehicle climbing a slope.

FIG. 1 shows a vehicle 101 which is climbing a sloping surface 102. The vehicle 101 comprises a vehicle body 103 and four wheels 104, of which two are shown. Each wheel 104 is provided with a height sensor 105 (not shown in FIG. 1) which measures the height of the vehicle body 103 in relation to the wheel. As is indicated in FIG. 1, the height sensor 105 which is attached to the rear right wheel of the vehicle measures $H_{RR}$, the height of a predetermined point on the vehicle body 103 with respect to the rear right wheel. Similarly, the height sensor 105 which is attached to the front right wheel of the vehicle measures $H_{FR}$, the height of a predetermined point on the vehicle body 103 with respect to the front right wheel. The other two height sensors 105 measure the height of the vehicle body 103 with respect to the rear left wheel ($H_{RL}$) and the front left ($H_{FL}$) wheel respectively.

The vehicle body 103 has a longitudinal axis 106. The longitudinal axis 106 is related to the surface 102 by an angle $\theta_{rel}$, as is indicated in FIG. 1. $\theta_{rel}$ is defined as the angle between the longitudinal axis 106 and the surface 102 when measured on a vertical plane which is coincident with the longitudinal axis 106 along the entirety of its length. In FIG. 1, the vertical plane is therefore the plane of the drawing.

The surface 102 is related to a horizontal plane 107 by an angle $\theta_{road}$, as is indicated in FIG. 1. The label $\theta_{road}$, is used since the surface is often a road, however the invention is not limited to uses on roads, and could be used for example by a vehicle during off-road use. $\theta_{road}$ is defined as the angle between the surface 102 and the horizontal plane 107 when measured on the vertical plane which is coincident with the longitudinal axis 106 of the vehicle body 103.

Both the horizontal and the vertical planes are defined with respect to gravity. The direction of acceleration due to gravity is illustrated in FIG. 1 by the line labeled g. The horizontal plane is perpendicular to the arrow g. The vertical plane is coincident with the line g along the entirety of its length.

Figure 2:
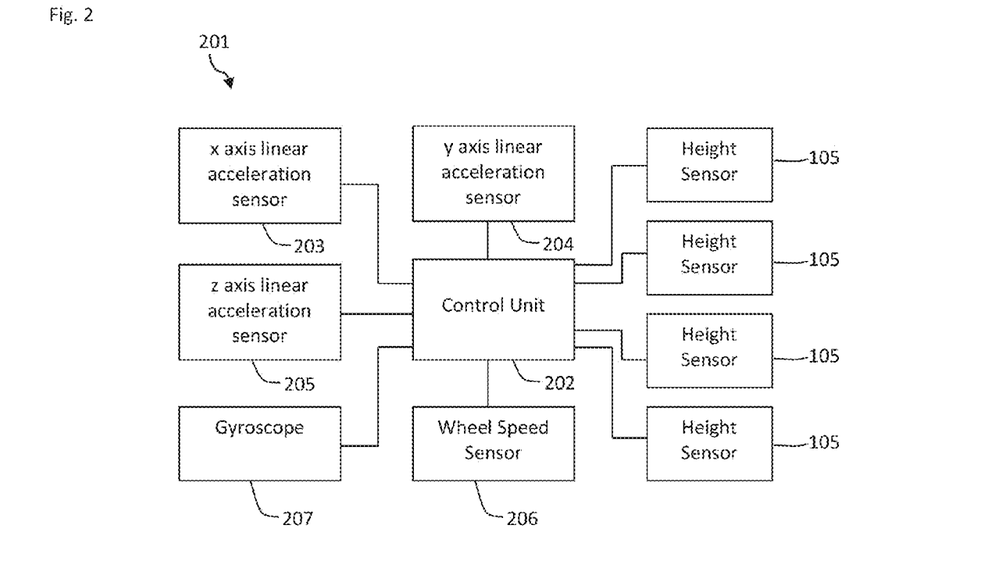
FIG. 2 is a block diagram showing a system according to an embodiment of the invention.

FIG. 2 shows an angle estimation system 201 according to the invention, which is provided for the vehicle 101 and comprises the four height sensors 105. The angle estimation system 201 comprises a control unit 202. The control unit receives input from the four height sensors 105, in the form of signals indicating the values of $H_{RR}$, $H_{FR}$, $H_{RL}$ and $H_{FL}$.

The angle estimation system 201 further comprises three linear acceleration sensors 203, 204, 205. Each linear acceleration sensor is suitable for measuring the acceleration of the vehicle body 103 on a particular axis, x, y or z. The x axis linear acceleration sensor 203 measures $a_x$, the acceleration of the vehicle body along the x axis, which is illustrated in FIG. 1 and is substantially coincident with the longitudinal axis of the vehicle body 103. As a result, $a_x$ is a measure of the acceleration "forwards" and "backwards", as they would be thought of by a driver of the vehicle. Similarly, the y axis linear acceleration sensor 204 measures $a_y$, the acceleration of the vehicle body along the y axis. The y axis is perpendicular to the x axis, and is substantially coincident with a lateral axis of the vehicle body. As a result, $a_y$ is a measure of the acceleration to the "right" and "left" as they would be thought of by a driver of the vehicle. Both the x axis and the y axis are substantially horizontal when the vehicle is at rest on a horizontal surface. The z axis linear acceleration sensor 205 measures $a_z$, the acceleration of the vehicle body along the z axis, which is perpendicular to both the x and y axes. The measurement $a_z$ is a measure of the acceleration "up" and "down" as they would be thought of by a driver of the vehicle. The control unit receives input from the three linear acceleration sensors 203, 204, 205, in the form of signals indicating the values of $a_x$, $a_y$ and $a_z$.

As such, the roll, pitch and yaw of the vehicle body can be thought of as rotations about the x axis, the y axis and the z axis, respectively.

The angle estimation system 201 further comprises a wheel speed sensor 206, which measures the speed of rotation of at least two wheels of the vehicle and hence determines u, the speed of the vehicle 101 with respect to the surface 102. The control unit receives input from the wheel speed sensor 206, in the form of signals indicating the value of u.

The angle estimation system 201 further comprises a gyroscope, which measures the rate of change in the pitch, roll and yaw of the vehicle body 103. The control unit 202 receives input from the gyroscope 207 in the form of signals indicating the value of $\theta_{glob}$, which is the pitch rate. The control unit also receives input from the gyroscope 207 which indicates the values the roll rate and the yaw rate respectively.

Figure 3:
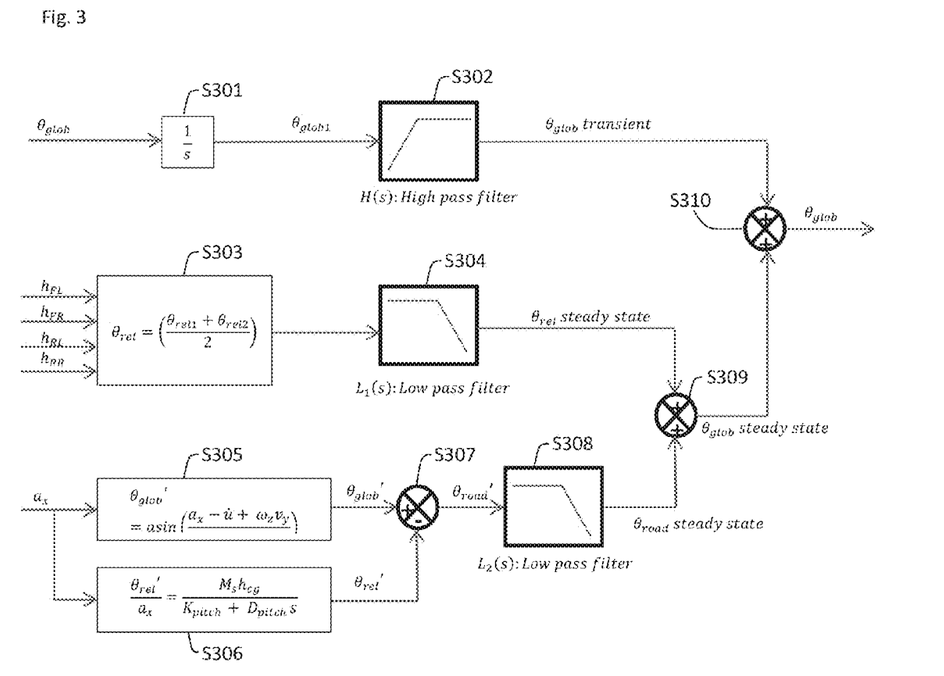
FIG. 3 is a diagram illustrating a method according to an embodiment of the invention.

The control unit 202 uses the measurements described above to arrive at an estimate of $\theta_{glob}$, the global pitch of the vehicle. $\theta_{glob}$ is indicated in FIG. 1, and is the angle of the longitudinal axis of the vehicle body 103 with respect to a horizontal plane, when measured in the vertical plane which is coincident with the longitudinal axis of the vehicle body 103. The method used for deriving an estimate of $\theta_{glob}$ is illustrated in FIG. 3.

An integral of the pitch rate provides the global pitch angle $\theta_{glob}$.

$$\theta_{glob1} = \int \theta_{glob} dt$$

The pitch rate measurement is, however, subject to contamination due to rolling and yawing of the vehicle. Therefore the sensor measurement also needs to be compensated due to roll bias. As such the control unit 202 uses the formula:

$$\theta_{glob1} = \int \theta_{glob}' dt$$

wherein $$\theta_{glob}' = \theta_{glob} - \omega_z \sigma$$

$\theta_{glob}$: Sensed pitch rate
$\omega_z$: Yaw rate
$\sigma$: Roll angle estimate This is illustrated as S301 in FIG. 3. The yaw rate $\omega_z$ may be measured by the gyroscope 207, or it may be calculated based on the position of the steering and the measured velocity of the wheels.

The initial conditions for this integral are unknown. The values produced by the integral calculation drift over time, as small errors in the measurements and sensor offsets mount up when integrated. As such $\theta_{glob1}$ is an accurate indication of transient changes in $\theta_{glob}$, but does not provide an accurate measure of long term changes in $\theta_{glob}$.

In order to compensate for these errors, $\theta_{glob1}$ is passed through a high pass filter at S302 to produce $\theta_{glob}$ transient, which is an accurate estimate of the transient, or high frequency, variations in global pitch. This is of little use by itself, so the control unit 202 is configured to also produce $\theta_{glob}$ steady state, an estimate of the steady state, or low frequency, variations in global pitch.

At S303 the control unit 202 calculates an estimate of $\theta_{rel}$ based upon the measurements of the height sensors. To begin with:

$$\theta_{rel1} = \text{atan}\left(\frac{h_{RL} - h_{FL}}{L}\right) \approx \left(\frac{h_{RL} - h_{FL}}{L}\right) \text{ (using small angle aproximation)}$$

In the same way:

$$\theta_{rel2} = \left(\frac{h_{RR} - h_{FR}}{L}\right)$$

With:
$h_{FL,FR,RL,RR}$: Front left, front right, rear left, rear right height of body with respect to respective wheel, as provided by height sensors
L: Length of vehicle wheel base As can be seen from these equations, $\theta_{rel1}$ and $\theta_{rel2}$ are estimates of $\theta_{rel}$ based upon the measurements of the height sensors on the left hand side of the vehicle and the right hand side of the vehicle respectively. Taking the average of both we obtain a more accurate relative pitch calculation:

$$\theta_{rel} = \left(\frac{\theta_{rel1} + \theta_{rel2}}{2}\right)$$

This calculation is an accurate relative pitch estimate across the entire frequency spectrum. However for the purposes of this method, the estimate is low pass filtered at S304 to produce $\theta_{rel}$ steady state, an accurate steady state relative pitch.

In the event that a height sensor stops working, any two sensors can be used to provide an estimate of $\theta_{rel}$, provided that the two sensors are on different axles of the vehicle 101.

As the vehicle pitches away from the horizontal, a component of the acceleration due to gravity can be measured by the x axis linear acceleration sensor. At S305, the control unit 202 calculates a global pitch estimate based upon the gravitational contamination of the x axis linear acceleration sensor, using the equation:

$$\theta'_{glob} = \arcsin\left(\frac{a_x - \dot{u} + \omega_z v_y}{g}\right)$$

With:
$a_x$: Sensed forward acceleration
$\omega_z v_y$: Longitudinal acceleration due to centrifugal acceleration ($\omega_z$: Yaw rate, $v_y$: Lateral velocity)
$\dot{u}$: Derivative with respect to time of the sensed forward speed u.

In the above equation, the acceleration due to changing speed and the acceleration due to centrifugal force are removed from $a_x$, leaving only the acceleration due to gravity, which can then be related to $\theta_{glob}'$.

This estimate will be accurate provided that the measured values are accurate. However large yaw rates can amplify any errors in the lateral velocity estimate.

Since accelerometers are typically subject to a considerable amount of noise, due to unpredictable movements in the vehicle, this calculation is more accurate for steady states than for transitory changes.

It is possible to model the vehicle as a linear spring damped system, since the suspension provides typically constant spring and damping characteristics. Therefore it is possible to calculate the relative pitch of the vehicle from the forward acceleration. This is done at S306.

Specifically, there are two external moments applied to the vehicle body: the moment due to vertical suspension forces, denoted as $M_{susp}$ and the moment due to longitudinal tire force, denoted as $M_{longforce}$.

$$M_{susp} = K_{pitch}\theta_{yr} + D_{pitch}\dot{\theta}_{yr}$$

$$M_{longforce} = M_s a_x h_{cg}$$

With:
$h_{cg}$: The height of the centre of gravity of the vehicle. This may be calculated, for example by monitoring measurements of the height sensors when the vehicle is at rest, or an estimate may be used such as a typical value for the vehicle with a driver and a standard load.

Since the pitch angular rate is usually small, we may take it that:

$$M_{longforce} - M_{susp} \approx 0$$

Hence, $$\theta'_{rel} + \frac{D_{pitch}}{K_{pitch}}\dot{\theta}'_{rel} = \frac{M_s a_x h_{cg}}{K_{pitch}}$$

Applying the Laplace transform we obtain the transfer function:

$$\frac{\theta'_{rel}}{a_x} = \frac{M_s h_{cg}}{K_{pitch} + D_{pitch} s}$$

Again, this calculation is most valid in a steady state condition.

As can be seen from FIG. 1, $\theta_{glob} = \theta_{rel} + \theta_{road}$. Therefore, at S307 the control unit 202 combines $\theta_{glob}'$ and $\theta_{rel}'$ to calculate $\theta_{road}'$ using:

$$\theta_{road}' = \theta_{glob}' - \theta_{rel}'$$

Therefore $\theta_{road}'$ can be calculated using the measurement $a_x$, and as such the x axis linear acceleration sensor is here being used as a surface angle sensor, that is a sensor which can be used in estimating the angle between the surface and a horizontal plane. At S308, $\theta_{road}'$ is low pass filtered to produce $\theta_{road}$ steady state, an estimate of the steady state surface pitch.

At S309, the control unit 202 calculates $\theta_{glob}$ steady state using:

$$\theta_{glob}\text{steady state} = \theta_{rel}\text{steady state} + \theta_{road}\text{steady state}$$

Having now calculated estimates of both the steady state and the transient variations in the global pitch, the control unit 202 combines them as S310 to produce $\theta_{glob}$, an estimate of the global pitch which can be used, for example, in managing rollover prevention systems.

Out of necessity, the three stages in calculating $\theta_{glob}$ have been described above in a particular order. However, they can be completed by the control unit 202 in any desired order, or in parallel in any combination. Control unit 202 can also switch between different stages as desired. For example the control unit 202 may calculate the values of any combination of $\theta_{glob1}$, $\theta_{road}'$ and $\theta_{rel}$ before beginning to apply any of the filters in steps S302, S304 and S308.

Ideally, the high and low pass filters should all use a similar cut off frequency in order to obtain pitch information across the frequency spectrum. Typically, the lower this cut off frequency is the more accurate the global pitch calculation will be, provided that the cut off is still high enough to filter out the integral drift in $\theta_{glob1}$.

It may be particularly advantageous for L2(s), the low pass filter in S308, to have a very low cut off frequency in order to filter inaccuracies in the pitch estimation derived from the forward accelerometer sensor. Therefore L2(s) may be provided with a lower cut off frequency than the other two filters.

In the event that the gyroscope 207 malfunctions, the control unit 202 may still obtain an estimate for $\theta_{glob}$ by combining $\theta_{rel}$ and $\theta_{road}'$:

$$\theta_{glob} = \theta_{rel} + \theta_{road}'$$

Some noise filtering is still required in such a calculation. Similarly, in the event of a malfunction of the height sensors 105, the control unit 202 can use $\theta_{glob}'$ in place of $\theta_{glob}$. In the event of a malfunction of the wheel speed sensor 206, or the x axis linear acceleration sensor 203, the control unit 202 can use $\theta_{glob1}$ in place of $\theta_{glob}$.

The description above describes using the technique to arrive at a pitch angle estimate $\theta_{glob}$. However, the same method can be used by the control unit 202 to provide a roll angle estimate, simply by switching the longitudinal axis with the lateral axis of the vehicle.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. The method of angle estimation for use in operating a vehicle which is travelling on a surface, the vehicle comprising a vehicle body which is attached to at least two wheels, the vehicle body having a first axis, the method comprising estimating the angle of said vehicle by:
   calculating $\theta_{glob1}$ as a first estimate of the angle $\theta_{glob}$ between the first axis and a horizontal plane;
   producing $\theta_{glob}$transient, an estimate of transient values of $\theta_{glob}$, by applying a high pass filter to $\theta_{glob1}$;
   calculating $\theta_{glob}$ steady state as an estimate of steady state values $\theta_{glob}$;
   calculating a further estimate of $\theta_{glob}$ from $\theta_{glob}$transient and $\theta_{glob}$steady state; and
   operating the vehicle using the further estimate of $\theta_{glob}$.

2. The method of angle estimation according to claim 1, the method comprising:
   providing a first height sensor for measuring $h_1$, the height of the vehicle body with respect to the first wheel;
   providing a second height sensor for measuring $h_2$, the height of the vehicle body with respect to the second wheel;
   providing a surface angle sensor for measuring $\theta_{road}$, the angle of the surface in relation to a horizontal plane;
   providing an orientation sensor for measuring $\theta_{glob}$, $\dot{\theta}_{glob}$ being the rate of change of $\theta_{glob}$ with respect to time;
   measuring the values of $h_1$, $h_2$, $\theta_{road}$ and $\dot{\theta}_{glob}$;
   calculating $\theta_{glob1}$ by integrating $\dot{\theta}_{glob}$ with respect to time;
   producing $\theta_{glob}$transient by applying a high pass filter to $\theta_{glob1}$;
   calculating the angle $\theta_{rel}$ of the first axis relative to the surface using the values of $h_1$ and $h_2$;
   calculating $\theta_{glob}$steady state by combining $\theta_{rel}$ and $\theta_{road}$ and applying at least one low pass filter; and
   calculating a further estimate of $\theta_{glob}$ from $\theta_{glob}$transient and $\theta_{glob}$steady state.

3. The method of angle estimation according to claim 2, wherein the surface angle sensor comprises an accelerometer for measuring $a_x$, the acceleration of the vehicle with respect to the first axis.

4. A method of angle estimation for use in a vehicle which is travelling on a surface, the vehicle comprising a vehicle body which is attached to at least two wheels, the vehicle body having a first axis, the method comprising:
   providing a first height sensor for measuring $h_1$, the height of the vehicle body with respect to the first wheel;
   providing a second height sensor for measuring $h_2$, the height of the vehicle body with respect to the second wheel;
   providing a surface angle sensor for measuring $\theta_{road}$, the angle of the surface in relation to a horizontal plane;
   measuring the values of $h_1$, $h_2$ and $\theta_{road}$;
   calculating the angle $\theta_{rel}$ of the first axis relative to the surface using the values of $h_1$ and $h_2$; and
   calculating an estimate of $\theta_{glob}$, the angle between the first axis and the horizontal plane, from $\theta_{road}$ and $\theta_{rel}$.

5. The method of angle estimation according to claim 4, wherein the surface angle sensor comprises an accelerometer for measuring $a_x$, the acceleration of the vehicle with respect to the first axis.

6. The method of angle estimation according to claim 5, wherein measuring $\theta_{road}$ comprises calculating an estimate $\theta_{road}'$, using the relationship:

$$\theta_{road}' = \theta_{glob}' - \theta_{rel}'$$

wherein $\theta_{glob}'$ and $\theta_{rel}'$ are estimates of $\theta_{glob}$ and $\theta_{rel}$.

7. The method of angle estimation according to claim 6, the method comprising calculating $\theta_{glob}'$ using the equation:

$$\theta'_{glob} = \arcsin\left(\frac{a_x - \dot{u} + \omega_z v_y}{g}\right)$$

wherein:
   $\omega_z$ is the rate of yaw of the vehicle;
   $v_y$ is the velocity of the vehicle along a second axis, the second axis being perpendicular to the first axis and perpendicular to the direction of acceleration due to gravity;
   $\dot{u}$ is the derivative with the respect to time of the speed of the vehicle along the first axis.

8. The method of angle estimation according to claim 6, the method comprising calculating $\theta_{rel}$ using the equation:

$$\frac{\theta'_{rel}}{a_x} = \frac{M_s h_{cg}}{K_{pitch} + D_{pitch} s}$$

wherein:
   $M_s$ is the mass of the vehicle;
   $h_{cg}$ is the height of the centre of gravity of the vehicle;
   $K_{pitch}$ is the spring term associated with the vehicle suspension; and
   $D_{pitch}s$ is the damping term associated with the vehicle suspension.

9. An angle estimation system for use in operating a vehicle which is travelling on a surface, the vehicle comprising a vehicle body which is attached to at least two wheels, the vehicle body having a first axis, the angle estimation system comprising a control unit, the control unit being arranged to:
   calculate $\theta_{glob1}$ as a first estimate of the angle $\theta_{glob}$ between the first axis and a horizontal plane;
   apply a high pass filter to $\theta_{glob1}$ to produce $\theta_{glob}$transient, an estimate of transient values of $\theta_{glob}$;

calculate $\theta_{glob}$ steady state, an estimate of steady state values of $\theta_{glob}$; and calculate a further estimate of $\theta_{glob}$ from $\theta_{glob}$ transient and $\theta_{glob}$ steady state, wherein the system is configured to operate the vehicle using the further estimate of $\theta_{glob}$.

10. The angle estimation system according to claim 9, the angle estimation system further comprising:

a first height sensor for measuring $h_1$, the height of the vehicle body with respect to the first wheel;

a second height sensor for measuring $h_2$, the height of the vehicle body with respect to the second wheel;

a surface angle sensor for measuring $\theta_{road}$, the angle of the surface in relation to a horizontal plane; and an orientation sensor for measuring $\dot{\theta}_{glob}$, $\dot{\theta}_{glob}$ being the rate of change of $\theta_{glob}$ with respect to time and $\theta_{glob}$ being the angle between the first axis and the horizontal plane, the control unit being arranged to:

receive signals from the sensors indicating the values of $h_1$, $h_2$, $\theta_{road}$ and $\dot{\theta}_{glob}$;

integrate $\dot{\theta}_{glob}$ with respect to time to calculate $\theta_{glob1}$;

apply a high pass filter to $\theta_{glob1}$ to produce $\theta_{glob}$ transient;

use the values of $h_1$ and $h_2$ to calculate $\theta_{rel}$, the angle of the first axis relative to the surface;

combine $\theta_{rel}$ and $\theta_{road}$, and apply a low pass filter, to produce $\theta_{glob}$ steady state; and calculate a further estimate of $\theta_{glob}$ from $\theta_{glob}$ transient and $\theta_{glob}$ steady state.

11. The angle estimation system according to claim 10, wherein the surface angle sensor comprises an accelerometer for measuring $a_x$, the acceleration of the vehicle with respect to the first axis.

12. A vehicle comprising an angle estimation system according to claim 9.

13. An angle estimation system for use in a vehicle which is travelling on a surface, the vehicle comprising a vehicle body which is attached to at least two wheels, the vehicle body having a first axis, the angle estimation system comprising:

a first height sensor for measuring $h_1$, the height of the vehicle body with respect to the first wheel;

a second height sensor for measuring $h_2$, the height of the vehicle body with respect to the second wheel;

a surface angle sensor for measuring $\theta_{road}$, the angle of the surface in relation to a horizontal plane; and a control unit, the control unit being arranged to:

receive signals from the sensors indicating the values of $h_1$, $h_2$ and $\theta_{road}$;

use the values of $h_1$ and $h_2$ to calculate $\theta_{rel}$, the angle of the first axis relative to the surface; and calculate an estimate of $\theta_{glob}$, the angle between the first axis and the horizontal plane, from $\theta_{road}$ and $\theta_{rel}$.

14. The angle estimation system according to claim 13, wherein the surface angle sensor comprises an accelerometer for measuring $a_x$, the acceleration of the vehicle with respect to the first axis.

15. The angle estimation system according to claim 14, wherein measuring $\theta_{road}$ comprises calculating an estimate $\theta_{road}'$, using the relationship:

$$\theta_{road}' = \theta_{glob}' - \theta_{rel}',$$

wherein $\theta_{glob}'$ and $\theta_{rel}'$ are estimates of $\theta_{glob}$ and $\theta_{rel}$.

16. The angle estimation system according to claim 15, the control unit being further arranged to calculate $\theta_{glob}'$ using the equation:

$$\theta'_{glob} = \arcsin\left(\frac{a_x - \dot{u} + \omega_z v_y}{g}\right)$$

wherein:

$\omega_z$ is the rate of yaw of the vehicle;

$v_y$ is the velocity of the vehicle along a second axis, the second axis being perpendicular to the first axis and perpendicular to the direction of acceleration due to gravity;

$\dot{u}$ is the derivative with the respect to time of the speed of the vehicle along the first axis.

17. The angle estimation system according to claim 15, the control unit being further arrange to calculate $\theta_{rel}'$ using the equation:

$$\frac{\theta'_{rel}}{a_x} = \frac{M_s h_{cg}}{K_{pitch} + D_{pitch} s}$$

wherein:

$M_s$ is the mass of the vehicle;

$h_{cg}$ is the height of the centre of gravity of the vehicle;

$K_{pitch}$ is the spring term associated with the vehicle suspension; and $D_{pitch} s$ is the damping term associated with the vehicle suspension.

* * * * *